UNITED STATES PATENT OFFICE.

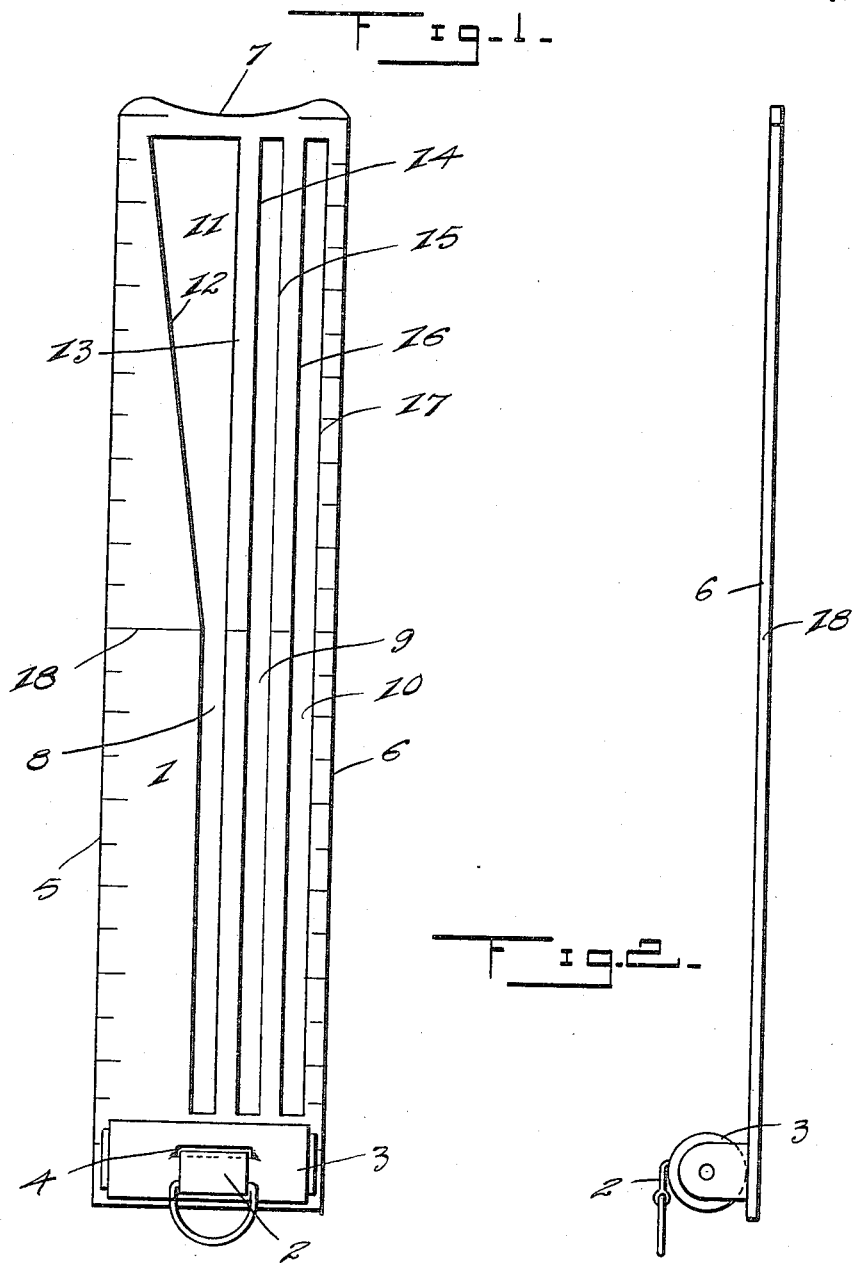

MICHAEL BEGANY, OF ELIZABETH, NEW JERSEY.

COMBINATION-RULER.

1,224,592.        Specification of Letters Patent.        Patented May 1, 1917.

Application filed January 29, 1916. Serial No. 75,088.

*To all whom it may concern:*

Be it known that I, MICHAEL BEGANY, a citizen of the United States, residing at Elizabeth, in the county of Union and State of New Jersey, have invented certain new and useful Improvements in Combination-Rulers; and I do hereby declare the following to be a full, clear, and exact description of the invention, such as will enable others skilled in the art to which it appertains to make and use the same.

The invention relates to a combination ruler.

The object of the present invention is to improve the construction of tailors' measures and to provide a simple, practical and comparatively inexpensive combination ruler designed for the use of tailors in taking the various measurements of a person for making suits of clothing and adapted particularly for making rapid measurements and for quickly marking off pants bottoms.

A further object of the invention is to provide a combination ruler of this character which will be found especially advantageous in measuring the inside seam of trousers and be adapted to easily reach high up in the crotch.

It is also an object of the invention to provide a combination ruler which will be adapted for accurately marking off goods for both plain and cuff bottom trousers and equipped with means for making the cuffs a plurality of different widths so that a cuff of the desired width may be marked off without changing the position of the ruler with relation to the edge of the goods or lining from which the bottoms are marked.

With these and other objects in view the invention consists in the construction and novel combination and arrangement of parts hereinafter fully described, illustrated in the accompanying drawing and pointed out in the claims hereto appended, it being understood that various changes in the form, proportion and minor details of construction may be resorted to without departing from the spirit or sacrificing any of the advantages of the invention.

In the drawing

Figure 1 is an elevation of a combination ruler constructed in accordance with this invention, Fig. 2 is an edge view.

Like numerals of reference designate corresponding parts in the several figures of the drawing.

In the accompanying drawing in which is illustrated the preferred embodiment of the invention, the combination ruler comprises in its construction a plate or bar 1 designed to be approximately one foot in length and equipped at one end with a spring actuated tape measure 2 designed to form a continuation of the measurements on the plate or bar 1 the graduations thereof being preferably from 1 to 12 inches and the tape measure 2 starting at 13 but of course the length of the bar or plate may be varied as will be readily understood and instead of employing a spring actuated tape measure a plain tape measure may of course be used.

The graduations commencing with 13 are on the front face of the tape measure 2 and the latter is designed to be provided at its rear face with graduations starting at 1 inch to enable the tape measure to be employed for ordinary purposes.

The spring actuated tape measure is provided with a suitable casing 3 having a slot or opening 4 at which the highest number on the extended portion of the tape measure 2 appears and at which point the tape measure is to be read. As the matter of mounting the tape measure within the casing and the arrangement of the spring is of the ordinary construction, illustration thereof is deemed unnecessary.

The plate or bar 1 is graduated at its edges 5 and 6 and it is provided with a concavely curved upper edge 7 adapted to be readily introduced high up in the crotch in taking the measurement of the length of the inside seam of a pair of trousers.

The plate or bar of the tape measure is provided with a plurality of longitudinal openings 8, 9 and 10 and the opening 8 which is nearest the longitudinal side edge 5 has an enlarged triangular upper portion 11. The graduated side edge 5 of the bar or body of the ruler is designed to be marked for cuff measurements and the side edge 12 of the opening 8 is designed for marking or shaping plain bottom pants, and opposite side edge 13 of the opening 8 is designed in practice for marking off one and one-quarter inch cuffs and will be located one and one-quarter inches from the graduated edge 5 of the ruler. The second longitudinal opening 9 is designed to have its longitudinal edges 14 and 15 located the proper distance from the graduated edge 5 for measuring cuffs one and one-half and one and three-quarter inches wide respectively, while the edges 16 and 17 of the opening 10 are designed to be arranged for measuring cuffs two inches and two and one-quarter inches wide respectively. The number of openings may of course be varied to suit requirements so that a cuff measurement of any desired range may be obtained. In marking off the bottoms of plain bottom trousers it is necessary to fold the goods forming the front portions of the legs at an angle and the goods is first marked off straight or at right angles to the length of the legs and then the second mark is made with the rear portion of the mark in parallelism with the first mark and the front portion of the mark at an angle thereto. The inclined edge 12, which enables this inclined or angularly disposed mark to be made, extends from one end of the opening 8 to approximately the center thereof and the adjacent edge, which forms a continuation of the inclined edge, is in parallelism with the side edge of the ruler. The plate or bar which constitutes the body ruler is also provided with a central transverse line which in the marking off of the goods for pants bottoms will be found particularly advantageous in arranging it at the center seam of the pants leg and especially when marking off plain bottom trousers. The combination ruler is adapted for taking the various measurements of the body for making clothes and will enable the measure of the waist, seat or bust or other portion of the body to be rapidly and accurately obtained. In taking such measurements the device should be held with the spring actuated tape measure facing and always at the end nearest the operator so that the various measurements indicated by the spring actuated tape measure may be clearly seen.

What is claimed is:—

1. A combination ruler including a plate provided with markings for making correct measurements and having a longitudinal opening tapered at one end to form an edge having one portion arranged at an angle to the side edge of the plate, the remaining portion of the edge having a straight edge extending from the inclined edge and arranged in parallelism with the side edge of the plate and coöperating with the said inclined edge to enable plain bottom trousers to be marked off.

2. A combination ruler including a plate or bar having graduations for cuff measurements and provided with a plurality of longitudinal openings provided with straight edges arranged different distances from the side edges of the plate or bar for marking off cuffs of different widths for pants bottoms, one of the openings being provided with an enlarged substantially triangular portion forming an inclined edge arranged at an angle to the adjacent portion of the longitudinal edge of such opening and coöperating therewith for shaping plain bottom pants.

In testimony whereof I affix my signature in presence of two witnesses.

MICHAEL BEGANY.

Witnesses:
 ERNEST A. UHLS,
 ALBERT B. DAY.

Copies of this patent may be obtained for five cents each, by addressing the "Commissioner of Patents, Washington, D. C."